J. Davis,
Scroll Sawing Machine.
N° 18,960.  Patented Dec. 29, 1857.
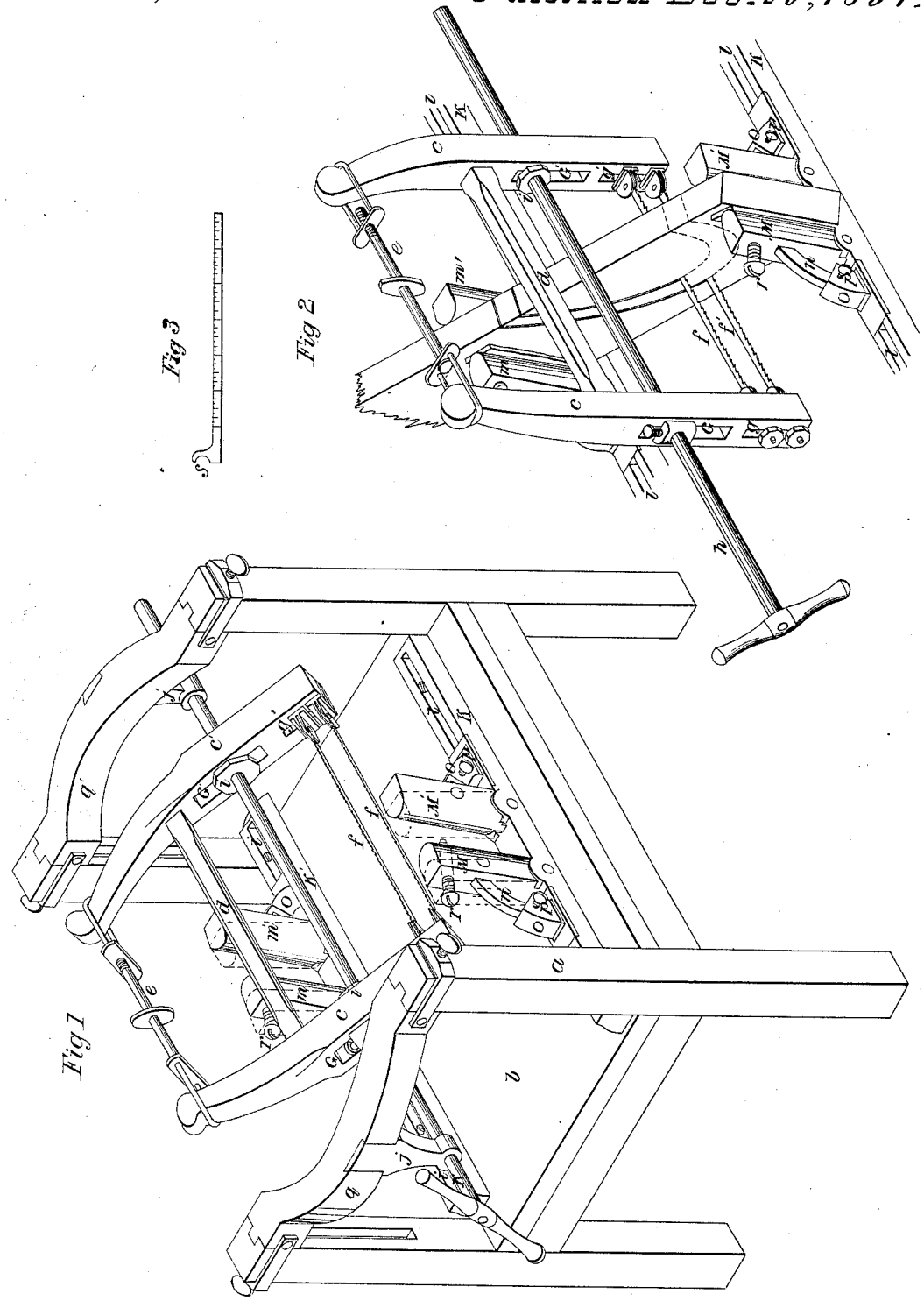

UNITED STATES PATENT OFFICE.

JOHN DAVIS, OF CINCINNATI, OHIO.

MACHINE FOR SAWING HAND-RAILS OR STAIR-WREATHS.

Specification of Letters Patent No. 18,960, dated December 29, 1857.

*To all whom it may concern:*

Be it known that I, JOHN DAVIS, of Cincinnati, Hamilton county, Ohio, have invented a new and useful Machine for Sawing Out Stair-Rail Wreaths and other Cylindrical Segments; and I hereby declare the following to be a full and exact description thereof, reference being had to the accompanying drawings, making part of this specification.

My invention has for its principal object the manufacture of the curved forms technically known as "wreaths," which are employed in the manufacture of "winding-stair-rails": the object being accomplished with greater economy of time and material than in the customary modes and without the necessity of employing raking molds.

In the accompanying drawings; Figure 1 is a perspective view of a machine embodying my improvements. Fig. 2 is a perspective view of a portion of my apparatus, exhibiting the action of the saw upon the stuff. Fig. 3 represents a gage for adjusting the saw blades to the radii of the desired cylinders.

($a$) is a rectangular frame supporting at about its mid-height a bench ($b$) ($c$, $c'$, $d$, $e$, $f$, $f'$, $g$, $g'$, G, G') is a saw whose stocks ($c$) ($c'$), stretcher ($d$) and straining-rod ($e$) are of customary construction. ($f$) ($f'$) are two blades whose attachment to the stocks is made adjustable by means of slots ($g$) ($g'$) in the latter. Two other slots (G) (G') permit the insertion and adjustment in the plane of the saw-frame of a rod or shaft ($h$) which is made fast to the saw-frame by means of nuts ($i$). The blades ($f$) ($f'$) and the shaft ($h$) are fixed in the saw-frame, always exactly parallel with each other and at such distances asunder as the radius of the well hole and the desired width of the rail may respectively require.

Depending from the upper beams ($q$) ($q'$) of the frame are two hangers ($j$) ($j'$) within which the shaft ($h$) being journaled can be drawn to and fro and at the same time rotated by the operator. By this compound motion the saw-blades are made to describe two orbits concentric with the shaft ($h$) and coincident with two cylinders of which the radius of the inner one corresponds with that of the well hole and that of the outer one is as much greater as the width of the desired rail.

($k$) ($k'$) are two bars attached—one near each side—to the bench ($b$) and called by me the "clamp-stocks." These clamp-stocks are both parallel to the shaft ($h$) and as near thereto as the maximum sweep of the saw will permit. Slots ($l$) in the clamp-stocks ($k$) ($k'$) admit of their longitudinal adjustment on the bench ($b$). Near the center of each clamp stock ($k$) ($k'$) a pair of jaws or clamps (M) (M') ($m$) ($m'$) are so hinged as to be capable of adjustment in a longitudinal vertical plane. Each jaw is provided with an arched bracket ($n$) which works in a socket ($o$) containing a set screw ($p$) for holding the jaw to any desired angle. The opposing or adjacent faces of each pair of jaws are rounded as represented. The two jaws of each pair may if preferred vibrate in unison, the front jaw (M) ($m$) of each pair being provided with a set screw ($r$) to hold the timber in contact with the face of the back jaw (M') ($m'$).

The operation is as follows:—The inner saw ($f$) is fixed at a distance from the shaft ($h$) corresponding to the radius of the well hole, and the outer saw ($f'$) at a distance from the inner one corresponding to the desired width of the stair rail. These adjustments may be facilitated by the use of the gage represented in Fig. 3, which is provided with a semi-circular notch ($s$) by which its end is brought and held coincident with the axis of the saw. The clamps ($k$) ($k'$) are then so adjusted longitudinally of the machine that a board lodged in them and resting against the two back jaws (M') ($m'$) will stand at an angle to the clamp stock corresponding to the "pitch" of the stair rail. The clamp-stocks ($k$) ($k'$) are then made fast to the bench and the back jaws (M') ($m'$) being inclined at an angle corresponding with the desired "spring" to be provided in the rail, a board of the usual dimensions of stair rail stuff is so clamped between the jaws that its working face bears against the front faces of the back jaws (M') ($m'$). The cutting edges of the saw-blades are then brought to bear on the edge of the board and a longitudinal and feeding motion being communicated to the saw, a cylindrical segment or "wreath" suitable for working up into stair rails is produced without any laying off, projection or drafting whatever. After once setting the machine, any number of similar segments may of course be produced without further adjustment.

The saw may be driven and fed by power if preferred.

The beams (q) (q') from which the hangers (j) (j') depend may be adjustable in height as represented or (to accomplish the same purpose) the bench (b) may be raisable by cams extending its entire breadth.

Machinery of this kind may be employed to get out a great variety of forms of cylindrical segments such as core and dome brackets and the ribs of skew groined and Gothic arches, nosings, well curbs, cylindro-cylindric window caps wheel fellies, &c.

I am aware that it has been proposed to produce stair rail wreaths by presenting the plank from which they are to be sawed at an oblique angle with the axis of rotation of the saw equivalent to that afforded by the longitudinal adjustment of my clamp stocks $k$, $k'$, but

I claim as new and of my invention herein:—

1. Providing what is technically known as "spring" in the rail by presenting the sides of the plank (that is to say the cutting planes of the warped surface) acutely or obtusely to the plane of adjustment of the clamp stock $k$, $k'$, or their equivalent.

2. The described construction and arrangement of the hinged jaws M, M', $m$, $m'$, and their accessories $n$, $o$, $p$, operating as explained in combination with the adjustable clamp stocks $k$, $k'$.

In testimony of which invention I hereunto set my hand.

JOHN DAVIS.

Attest:
 GEO. H. KNIGHT,
 OCT. KNIGHT.